US008001780B2

(12) United States Patent
Onodera

(10) Patent No.: US 8,001,780 B2
(45) Date of Patent: Aug. 23, 2011

(54) SUPERCHARGED ENGINE WITH EGR DEVICE

(75) Inventor: Yasuyuki Onodera, Oyama (JP)

(73) Assignee: Komatsu Ltd., Tokyo (JP)

( * ) Notice: Subject to any disclaimer, the term of this patent is extended or adjusted under 35 U.S.C. 154(b) by 697 days.

(21) Appl. No.: 11/817,943

(22) PCT Filed: Mar. 8, 2006

(86) PCT No.: PCT/JP2006/304511
§ 371 (c)(1),
(2), (4) Date: Oct. 9, 2007

(87) PCT Pub. No.: WO2006/095789
PCT Pub. Date: Sep. 14, 2006

(65) Prior Publication Data
US 2009/0049835 A1 Feb. 26, 2009

(30) Foreign Application Priority Data
Mar. 9, 2005 (JP) ................. 2005-066069

(51) Int. Cl.
F02B 33/44 (2006.01)
F02M 25/07 (2006.01)
(52) U.S. Cl. ........ 60/606; 60/611; 60/605.2; 123/568.11
(58) Field of Classification Search ............ 60/611, 60/605.2, 606; 123/568.11; F02M 25/07
See application file for complete search history.

(56) References Cited

U.S. PATENT DOCUMENTS

| 2,952,968 | A | * | 9/1960 | Lieberherr | 60/611 |
| 4,404,805 | A | * | 9/1983 | Curtil | 60/606 |
| 4,513,572 | A | * | 4/1985 | Bonnaud | 60/618 |
| 4,561,253 | A | * | 12/1985 | Curtil | 60/606 |
| 4,674,283 | A | * | 6/1987 | Ishida et al. | 60/606 |
| 5,706,790 | A | * | 1/1998 | Kemmler et al. | 123/564 |
| 6,038,860 | A | * | 3/2000 | Bailey | 60/605.2 |
| 6,216,458 | B1 | * | 4/2001 | Alger et al. | 60/605.2 |

(Continued)

FOREIGN PATENT DOCUMENTS

JP          09137754 A  *  5/1997

(Continued)

OTHER PUBLICATIONS

The International Preliminary Report on Patentability (IPRP) (undated), issued in a counterpart International Application.

(Continued)

Primary Examiner — Thai Ba Trieu
(74) Attorney, Agent, or Firm — Holtz, Holtz, Goodman & Chick PC

(57) ABSTRACT

An engine (1) has an exhaust manifold (12) provided with a communicating portion (25B) of a bypass line (25) from an air-supply side and a branch portion (31A) to an EGR line (31). When an exhaust gas outlet (13) is provided in an intermediary of the exhaust manifold (12) in a longitudinal direction along an engine cylinder line, the communicating portion (25B) of the bypass line (25) and the branch portion (31A) of the EGR line (31) that are provided on the exhaust manifold (12) are provided on both sides in the longitudinal direction sandwiching the exhaust gas outlet (13) and spaced apart from each other so that a part of the exhaust gas is pushed by an air supply fed from the bypass line (25) is pushed to enter the EGR line (31).

9 Claims, 3 Drawing Sheets

U.S. PATENT DOCUMENTS

| | | | |
|---|---|---|---|
| 6,470,864 B2 * | 10/2002 | Kim et al. | 60/605.2 |
| 6,598,396 B2 * | 7/2003 | Bailey | 60/605.2 |
| 6,732,524 B2 * | 5/2004 | Sponton | 60/605.2 |
| 6,912,852 B2 * | 7/2005 | Gottemoller et al. | 60/606 |
| 7,128,035 B2 * | 10/2006 | Lancaster et al. | 123/179.18 |
| 7,451,597 B2 * | 11/2008 | Kojima et al. | 60/605.2 |
| 2003/0127079 A1 | 7/2003 | Onodera et al. | |
| 2004/0011036 A1 | 1/2004 | Sponton | |
| 2005/0204730 A1 * | 9/2005 | Tsukahara et al. | 60/290 |

FOREIGN PATENT DOCUMENTS

| | | |
|---|---|---|
| JP | 11-311161 A | 11/1999 |
| JP | 2001-165000 A | 6/2001 |
| JP | 2001-355502 A | 12/2001 |
| JP | 2003-534488 A | 11/2003 |
| JP | 2004-19589 A | 1/2004 |
| WO | WO 01-90560 A1 | 11/2001 |

OTHER PUBLICATIONS

Japanese Office Action dated Aug. 4, 2009 (3 pages), and English translation thereof (5 pages), issued in counterpart Japanese Application Serial No. 2007-507163.

* cited by examiner

SUPERCHARGED ENGINE WITH EGR DEVICE

This application is a U.S. National Phase Application under 35 USC 371 of International Application PCT/JP2006/304511 filed Mar. 8, 2006.

TECHNICAL FIELD

The present invention relates to supercharged engine with EGR (exhaust gas recirculation) device.

BACKGROUND ART

An EGR device that lowers combustion temperature of a diesel engine to reduce NOx generation has been known.

A part of the exhaust gas can be securely returned to supply side when exhaust-side pressure is higher than air-supply-side pressure in such EGR device. However, when, for instance, the engine is driven at medium-high speed and high-load range, the pressure of air supercharged by an exhaust turbocharger and the like may become significantly higher than exhaust gas pressure in accordance with drive condition of an engine. Even when a venturi is provided to an EGR line, the exhaust gas does not return to the air-supply side if an EGR valve is opened under the above condition and, in addition, the air supply may flow to the exhaust side, so that sufficient air supply may not be fed to the engine.

In view of the above, it has been proposed to bypass an upstream section of air-supply line relative to the junction of EGR line with a bypass line to be connected to the exhaust side (see Patent Document 1, for instance). By opening a bypass valve provided in the bypass line when the air-supply pressure becomes higher than the exhaust pressure, a part of air supply can be delivered to the exhaust side to increase the exhaust pressure, so that the exhaust gas can be securely returned to the air-supply side through the EGR line.

[Patent Document 1]JP2001-165000 A

DISCLOSURE OF THE INVENTION

Problems to Be Solved by the Invention

Incidentally, the bypass line of the Patent Document 1 is in communication with an intermediary section of an exhaust pipe on the exhaust side provided between an exhaust manifold and a supercharger. The EGR line is also branched from an intermediary section of the exhaust pipe.

However, in an extremely narrow engine room such as that of construction machine, since the provision of the communicating portion and the branching portion on the intermediary section of the exhaust pipe complicates the structure of the exhaust pipe and occupies a large space, provision of such exhaust pipe is practically difficult.

Accordingly, various solutions have been tried to solve the layout-space problem, where the structure of the exhaust pipe is simplified by directly intercommunicating a bypass line with exhaust manifold or directly branching an EGR line from exhaust manifold. However, such arrangement may hinder EGR effect: e.g. the air supply from the bypass line directly enters EGR line according to intercommunicating position of bypass line and branching position of EGR line in exhaust manifold, for which solution has been desired.

An object of the present invention is to provide a supercharged engine with an EGR device that can save layout-space and efficiently return the exhaust gas to air-supply side.

Means for Solving the Object

A supercharged engine with an EGR device according to an aspect of the present invention includes: an exhaust manifold that collects exhaust gas discharged from respective cylinders to a single exhaust gas outlet; an intake manifold that distributes air supply from a supercharger to the respective cylinders; an air-supply line from a compressor outlet of the supercharger to the intake manifold; a bypass line that intercommunicates the air-supply line and the exhaust manifold; and an EGR line that extracts a part of the exhaust gas from the exhaust manifold to return the part of the exhaust gas to the air-supply line, in which the exhaust gas outlet of the exhaust manifold is provided in an intermediary in a longitudinal direction along an engine-cylinder line, and a communicating portion of the bypass line and a branch portion of the EGR line that are provided on the exhaust manifold are located on both sides in the longitudinal direction sandwiching the exhaust gas outlet and are spaced apart from each other so that a part of the exhaust gas is pushed by air supply fed from the bypass line to enter the EGR line.

A supercharged engine with an EGR device according to another aspect of the present invention, includes: an exhaust manifold that collects exhaust gas discharged from respective cylinders to a single exhaust gas outlet; an intake manifold that distributes air supply from a supercharger to the respective cylinders; an air-supply line from a compressor outlet of the supercharger to the intake manifold; a bypass line that intercommunicates the air-supply line and the exhaust manifold; and an EGR line that extracts a part of the exhaust gas from the exhaust manifold to return the part of the exhaust gas to the air-supply line, in which the exhaust gas outlet of the exhaust manifold is provided on an end in a longitudinal direction along an engine-cylinder line, a communicating portion of the bypass line is provided on the exhaust manifold on a side of the exhaust gas outlet, a branch portion of the EGR line is provided on a side remote from the exhaust gas outlet relative to the communicating portion of the bypass line, and the communicating portion and the branch portion are spaced apart from each other so that a part of the exhaust gas is pushed by air supply fed from the bypass line to enter the EGR line.

A supercharged engine with an EGR device according to still another aspect of the present invention includes: an exhaust manifold that collects exhaust gas discharged from respective cylinders to a single exhaust gas outlet; an intake manifold that distributes air supply from a supercharger to the respective cylinders; an air-supply line from a compressor outlet of the supercharger to the intake manifold; a bypass line that intercommunicates the air-supply line and the exhaust manifold; and an EGR line that extracts a part of the exhaust gas from the exhaust manifold to return the part of the exhaust gas to the air-supply line, in which the exhaust gas outlet of the exhaust manifold is provided in an intermediary in a longitudinal direction along an engine-cylinder line, and a communicating portion of the bypass line and a branch portion of the EGR line that are provided on the exhaust manifold are located on both sides in the longitudinal direction sandwiching the exhaust gas outlet.

A supercharged engine with an EGR device, comprising: an exhaust manifold that collects exhaust gas discharged from respective cylinders to a single exhaust gas outlet; an intake manifold that distributes air supply from a supercharger to the respective cylinders; an air-supply line from a compressor outlet of the supercharger to the intake manifold; a bypass line that intercommunicates the air-supply line and the exhaust manifold; and an EGR line that extracts a part of the exhaust gas from the exhaust manifold to return the part of the exhaust gas to the air-supply line, in which the exhaust gas outlet of the exhaust manifold is provided on an end in a longitudinal direction along an engine-cylinder line, a communicating portion of the bypass line is provided on the exhaust manifold on a side of the exhaust gas outlet, and a branch portion of the EGR line is provided on a side remote from the exhaust gas outlet relative to the communicating portion of the bypass line.

In the above, though the communicating portion of the bypass line and the branch portion of the EGR line are provided on the exhaust manifold, since the exhaust manifold is inherently a large-size component extending along the cylinder-line direction, the volume does not substantively increase even when the communicating portion and the branch portion are newly provided. Accordingly, layout space can be considerably reduced as compared to provision of complicated and large-size exhaust pipe provided with the communicating portion and the branch portion.

Further, when the exhaust gas outlet is provided in the intermediary of the cylinder line, the communicating portion of the bypass line and the branch portion of the EGR line are spaced apart by a predetermined distance sandwiching the exhaust gas outlet. Alternatively, when the exhaust gas outlet is provided on an end in the cylinder-line direction, the branch portion of the EGR line is located more remote from the exhaust gas outlet than the communicating portion of the bypass line. Accordingly, the air supply fed from the bypass line does not enter into the EGR line, thereby securely ensuring EGR amount.

In the supercharged engine with the EGR device of the above aspect of the present invention, exhaust gas inlet ports to which the exhaust gas from the cylinder flows are preferably provided on the exhaust manifold corresponding to a plurality of the cylinders, and at least one of the exhaust gas inlet ports is preferably located between the communicating portion and the branch portion.

According to the above arrangement, since at least one of the exhaust gas inlet ports is located between the communicating portion of the bypass line and the branch portion of the EGR line that are provided on the exhaust manifold, the exhaust gas delivered from the exhaust gas inlet port is pushed by the air supply fed through the bypass line to enter into the EGR line and the air supply from the bypass line is introduced into the located-nearer exhaust gas outlet. Accordingly, the air supply fed through the bypass line does not enter into the EGR line, thus securely ensuring the EGR amount.

In the supercharged engine with the EGR device according to the above aspect of the invention, the communicating portion of the bypass line that is provided on the exhaust manifold is preferably provided near one end in the longitudinal direction, and the branch portion of the EGR line is preferably provided near the other end in the longitudinal direction.

According to the above arrangement, since the communicating portion of the bypass line and the branch portion of the EGR line are located on both ends of the exhaust manifold in a greatly spaced-apart manner, the air supply from the bypass line can be prevented in the most preferable manner.

In the supercharged engine with the EGR device according to the above aspect of the invention, the exhaust manifold that collects the exhaust gas to a single exhaust gas outlet is preferably provided as a pair of a first manifold and a second manifold.

According to the above arrangement, since the exhaust manifold is provided as a pair of the first and the second manifolds, the air supply fed through the bypass line does not enter into the EGR line and the EGR amount can be securely ensured. In addition, exhaust interference of the exhaust gas from the cylinder can be eliminated, so that exhaust process can be smoothly conducted and the response of the supercharger can be improved.

Figure 1:
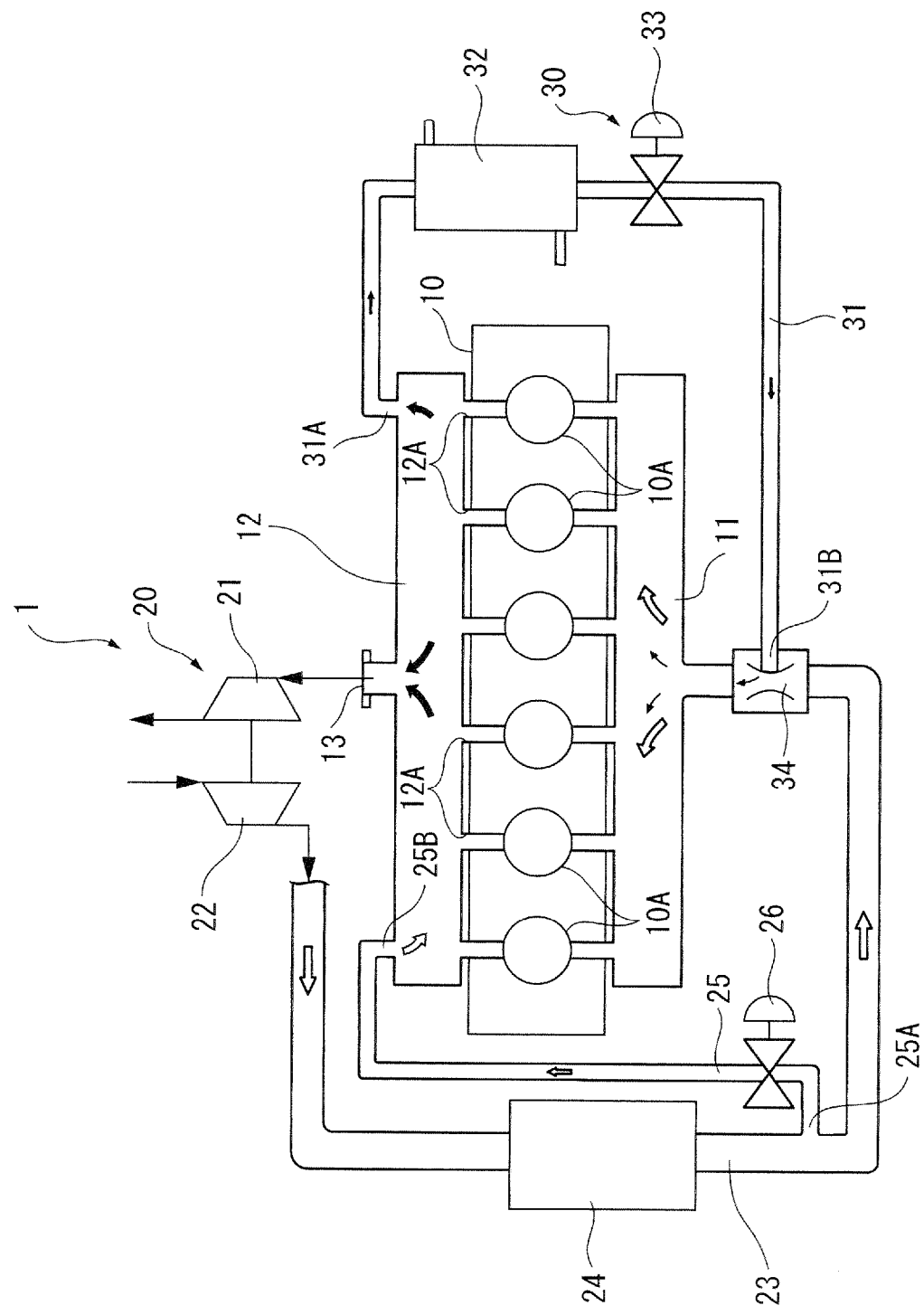
FIG. 1 is a schematic illustration showing a supercharged engine according to first embodiment of the invention.

EXPLANATION OF CODES 1, 2, 3 . . . supercharged engine, 10A . . . cylinder, 11 . . . air-supply manifold, 12 . . . exhaust manifold, 12A . . . exhaust gas inlet port, 13, 131, 132 . . . exhaust gas outlet, 23 . . . air-supply line, 25 . . . bypass line, 25B . . . communicating portion, 30 . . . EGR device, 31 . . . EGR line, 31A . . . branch portion.

BEST MODE FOR CARRYING OUT THE INVENTION

Embodiments of the invention will be described below with reference to the drawings. Incidentally, components of the below-described second and third embodiments identical with those of following first embodiment will be numbered with the same reference numeral to omit description thereof.

First Embodiment

FIG. 1 is a schematic illustration showing a supercharged engine according to first embodiment of the invention.

The engine 1 is a straight-six diesel engine, which includes an engine body having a cylinder head 10, a supercharger 20 composed of an exhaust turbocharger that supercharges intake air, and an EGR device 30 that restrains NOx generation.

Air-supply manifold 11 that distributes air-supply to respective cylinders 10A is attached to intake-port side of the cylinder head 10 and exhaust manifold 12 that collects exhaust gas from the respective cylinders 10A is attached to the exhaust-port side of the cylinder head 10, respectively. The exhaust manifold 12 is a single port manifold including a plurality of exhaust gas inlet ports 12A provided corresponding to the respective cylinders 10A and a single exhaust gas outlet 13 provided at the center thereof in cylinder-line direction.

The supercharger 20 has a turbine 21 that is rotated by an exhaust energy of the exhaust gas and a compressor 22 that rotates together with the turbine 21 to compress the intake air. An air-supply line 23 intercommunicates the outlet of the compressor 22 to the intake manifold 11. An after cooler 24 is provided in the intermediary of the air-supply line 23.

A downstream side of the air-supply line 23 relative to the after-cooler 24 is in communication with the exhaust manifold 12 through a bypass line 25. A bypass valve 26 is provided in the intermediary of the bypass line 25. When the air-supply pressure is higher than the exhaust gas pressure, the bypass valve 26 is opened to feed a part of the air supply to the exhaust side bypassing the engine body.

The EGR device 30 includes an EGR line 31 branched from a branch portion 31A of the exhaust manifold 12 to be in communication with a downstream side (downstream relative to a branch section 25A of the bypass line 25) of the air-supply line 23. An EGR cooler 32 for cooling the exhaust gas returned to the air-supply side is provided in the intermediary of the EGR line 31.

An EGR valve 33 is provided on the EGR line 31 on the downstream side of the EGR cooler 32. When the exhaust gas pressure is higher than the air-supply pressure, the EGR valve 33 is opened to return a part of the exhaust gas to the air-supply side. At this time, the exhaust gas from the EGR line 31 is returned in a manner sucked by a venturi 34 provided on a connecting portion 31B with the air-supply line 23.

In the engine 1 of the present embodiment, even when the air-supply pressure is higher than the exhaust pressure as in driving at medium-high speed and high load range, both of the bypass valve 26 and the EGR valve 33 are opened to feed a part of the air supply to the exhaust side to increase the pressure within the exhaust manifold 12. A part of the exhaust gas is then pushed out to the EGR line 31 so that the exhaust gas is securely returned to the air-supply side.

Specific arrangement for securely returning a part of the exhaust gas to the air-supply side even when air-supply pressure is higher than exhaust gas pressure will be described below.

Specifically, a communicating portion 25B of the bypass line 25 from the air-supply side is provided on the exhaust manifold 12 near a first end in the longitudinal (cylinder-line) direction of the exhaust manifold 12. The branch portion 31A of the EGR line 31 is provided near a second end of the exhaust manifold 12 in the longitudinal direction sandwiching the exhaust gas outlet 13. The plurality of exhaust gas inlet ports 12A are located between the spaced-apart communicating portion 25B and the branch portion 31A.

The spaced-apart arrangement of the communicating portion 25B and the branch portion 31A sandwiching the exhaust gas outlet 13 allows discharging the air supply fed into the exhaust manifold 12 from the communicating portion 25B without reaching to the branch portion 31A. Further, since the exhaust gas inlet ports 12A are located between the communicating portion 25B and the branch portion 31A, the exhaust gas flowing from the exhaust gas inlet ports 12A is pushed toward the branch portion 31A by the air supply from the bypass line 25. Accordingly, the air supply from the bypass line 25 does not enter the EGR line 31 together with the exhaust gas. Further, since the communicating portion 25B and the branch portion 31A are spaced apart approximately at the maximum, the most desirable condition where the air supply is hardly mixed into the EGR line 31 can be obtained.

Pressure increase within the exhaust manifold 12 in accordance with feeding a part of the air supply pushes the exhaust gas corresponding to the delivered air supply to the EGR line 31, thus securely obtaining EGR amount.

Incidentally, though the communicating portion 25B and the branch portion 31A are spaced apart on both sides of the exhaust manifold 12 with approximately the maximum distance, any arrangement, including adjoining arrangement, is possible as long as the communicating portion 25B and the branch portion 31A are located sandwiching the exhaust gas outlet 13. However, even when the communicating portion 25B and the branch portion 31A are provided sandwiching the exhaust gas outlet 13, the supplied air may enter the EGR line 31 together with the exhaust gas if the communicating portion 25B and the branch portion 31A are too closely provided. Accordingly, it is necessary that the communicating portion 25B and the branch portion 31A are spaced apart with each other so as to prevent mixing of air supply, i.e. so that only a part of the exhaust gas is pushed to be securely entered into the EGR line 31.

In accordance with the present embodiment, since the communicating portion 25B and the branch portion 31A are not provided on the exhaust pipe connecting the exhaust manifold 12 and the supercharger 20 but are directly provided on the inherently large-size exhaust manifold 12, increase in installation space can be reduced as compared to an arrangement of providing the communicating portion 25B and the branch portion 31A on the exhaust pipe, thus achieving proper adaptation to construction machine and the like with restricted installation space.

Second Embodiment

Figure 2:
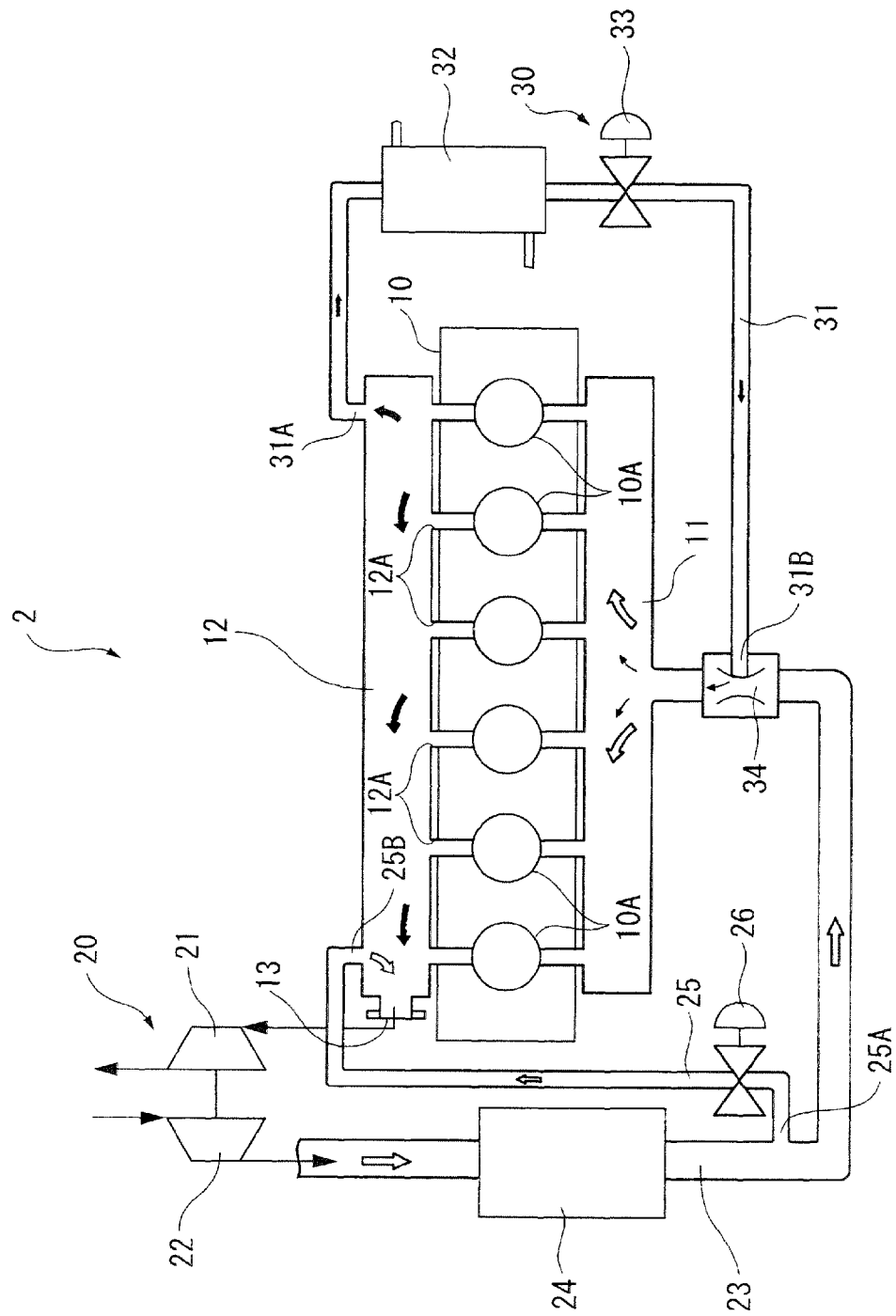
FIG. 2 is a schematic illustration showing a supercharged engine according to second embodiment of the invention.

FIG. 2 is a schematic illustration showing a supercharged engine 2 according to second embodiment of the invention.

In the engine 2 of the present embodiment, the exhaust gas outlet 13 of the exhaust manifold 12 is provided on an end in cylinder-line longitudinal direction. As a result, the communicating portion 25B of the bypass line 25 is located near the exhaust gas outlet 13, which is distinctly different from the first embodiment. The other arrangement is the same as the first embodiment. For instance, the branch portion 31A of the EGR line 31 is provided on the other end of the exhaust manifold 12 and is spaced apart from the communicating portion 25B approximately at the maximum.

In the present embodiment, the air supply fed into the exhaust manifold 12 does not return to the air-supply side through the EGR line 31 together with the exhaust gas and the same advantage as the first embodiment can be provided by the rest of the arrangement configured in the same manner as the first embodiment.

Third Embodiment

Figure 3:
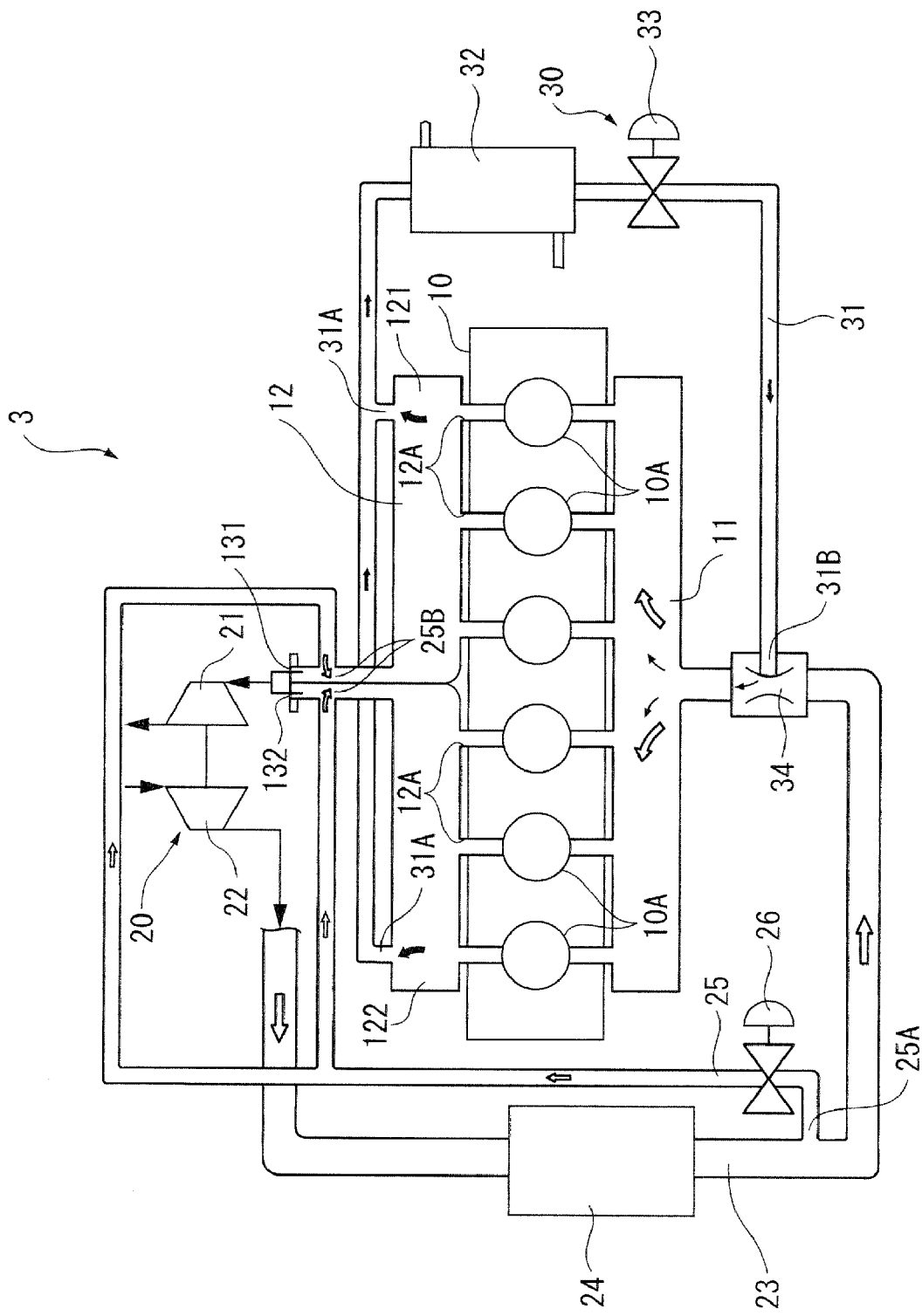
FIG. 3 is a schematic illustration showing a supercharged engine according to third embodiment of the invention.

FIG. 3 is a schematic illustration showing a supercharged engine 3 according to third embodiment of the invention.

In the engine 3 of the present embodiment, the exhaust manifold 12 is a dual port manifold including a first manifold 121 and a second manifold 122 that collect the exhaust gas from three cylinders 10A. Exhaust gas outlets 131 and 132 are respectively provided on the manifolds 121 and 122. The exhaust gas outlets 131 and 132 are disposed close to each other. The exhaust gases from the exhaust gas outlets 131 and 132 join within a turbine housing of the supercharger 20 in the end.

In the present embodiment, each of the first and the second manifolds 121 and 122 has an arrangement similar to the exhaust manifold 12 described in the second embodiment except for the length thereof. Accordingly, the communicating portion 25B of the bypass line 25 is provided near an end (i.e. on the side of the exhaust gas outlets 131 and 132) and the branch portion 31A of the EGR line 31 is provided near the other end of the first and the second manifolds 121 and 122.

In the present embodiment, though the arrangement of the bypass line 25 and the EGR line 31 becomes slightly complicated, the air supply fed to the exhaust side does not enter the EGR line 31 together with the exhaust gas in the same manner as the second embodiment, where the same advantages as the second embodiment can be obtained.

Since the exhaust manifold 12 is divided into the first and the second manifolds 121 and 122, exhaust interference with the exhaust gas from the cylinder 10A can be eliminated, thus smoothly discharging the exhaust gas and improving response of the supercharger 20.

Incidentally, the scope of the present invention is not limited to the above-described embodiment, but includes other arrangement as long as an object of the present invention can be achieved, which includes following modifications and the like.

For instance, the exhaust manifold 12 of the third embodiment is a dual port manifold including the first and the second manifolds 121 and 122, each of which is different in length from the exhaust gas manifold 12 of the second embodiment. However, the dual port exhaust manifold may be provided by two (first and second) exhaust manifolds of the first embodiment with different length that respectively cover three cylinders. The arrangement is especially desirable for V-shaped engine and so-called twin-turbo engine having a pair of superchargers for each of the first and the second manifolds.

Though the branch portion 25A of the bypass line 25 is provided on the downstream side of the after-cooler 24 in the air-supply line 23, the branch portion 25A may be provided on the upstream of the after-cooler 24. Since the above arrangement also allows air supply through the bypass line 25, the same advantage as the above embodiment can be obtained.

Though the best mode and process for implementing the invention has been disclosed in the above description, the scope of the present invention is not limited thereto. Specifically, though the present invention is specifically illustrated and described with reference to specific embodiments, various modifications to the above embodiments are possible in terms of shape, number and other detailed arrangement without departing from the technical idea and object of the invention.

Accordingly, the above description for limiting shape, number and the like is merely an example for facilitating the understanding of the invention and serves no limitative purpose. The description of components of a name without a part of or the entirety of limitation regarding shape and number is included in the invention.

INDUSTRIAL APPLICABILITY

The present invention is applicable to supercharged engine installed on a construction machine, as well as a supercharged engine installed on a transportation truck and stationary industrial machine such as power generator and the like.

The invention claimed is:

1. A supercharged engine with an EGR device, comprising:
an exhaust manifold that collects exhaust gas discharged from respective cylinders to a single exhaust gas outlet;
an intake manifold that distributes air supply from a turbocharger to the respective cylinders;
an air-supply line from a compressor outlet of the turbocharger to the intake manifold;
a bypass line that branches off the air-supply line at a position downstream of an after-cooler and intercommunicates the air-supply line and the exhaust manifold; and
an EGR line that extracts a part of the exhaust gas from the exhaust manifold to return the part of the exhaust gas to the air-supply line;
wherein the turbocharger comprises a compressor which is connected to the intake manifold, and a turbine which is connected to the exhaust manifold;
wherein the bypass line communicates with the exhaust manifold at a communicating portion which is provided on one end of the exhaust manifold in a longitudinal direction along an engine-cylinder line; and
wherein the EGR line branches from the exhaust manifold at a branch portion which is provided on another end of the exhaust manifold in the longitudinal direction.

2. The supercharged engine with the EGR device according to claim 1,
wherein exhaust gas inlet ports to which the exhaust gas from the cylinder flows are provided on the exhaust manifold corresponding to a plurality of the cylinders, and
wherein at least one of the exhaust gas inlet ports is located between the communicating portion and the branch portion.

3. The supercharged engine with the EGR device according to claim 1,
wherein the exhaust manifold that collects the exhaust gas to a single exhaust gas outlet is provided as a pair of a first manifold and a second manifold.

4. A supercharged engine with an EGR device, comprising:
an exhaust manifold that collects exhaust gas discharged from respective cylinders to a single exhaust gas outlet;
an intake manifold that distributes air supply from a turbocharger to the respective cylinders;
an air-supply line from a compressor outlet of the turbocharger to the intake manifold;
a bypass line that branches off the air-supply line at a position downstream of an after-cooler and intercommunicates the air-supply line and the exhaust manifold; and
an EGR line that extracts a part of the exhaust gas from the exhaust manifold to return the part of the exhaust gas to the air-supply line;
wherein the turbocharger comprises a compressor which is connected to the intake manifold, and a turbine which is connected to the exhaust manifold;
wherein the bypass line communicates with the exhaust manifold at a communicating portion which is provided on one end of the exhaust manifold in a longitudinal direction along an engine-cylinder line;
wherein the EGR line branches from the exhaust manifold at a branch portion which is provided on another end of the exhaust manifold in the longitudinal direction; and
wherein the exhaust gas outlet of the exhaust manifold is provided between the communicating portion and the branch portion.

5. The supercharged engine with the EGR device according to claim 4,
wherein an exhaust gas inlet port to which the exhaust gas from the cylinder flows is provided on the exhaust manifold corresponding to a plurality of the cylinders, and
wherein at least one of the exhaust gas inlet ports is located between the communicating portion and the branch portion.

6. The supercharged engine with the EGR device according to claim 4,
wherein the exhaust manifold that collects the exhaust gas to the single exhaust gas outlet is provided as a pair of a first manifold and a second manifold.

7. A supercharged engine with an EGR device, comprising:
an exhaust manifold that collects exhaust gas discharged from respective cylinders to a single exhaust gas outlet;
an intake manifold that distributes air supply from a turbocharger to the respective cylinders;
an air-supply line from a compressor outlet of the turbocharger to the intake manifold;

a bypass line that branches off the air-supply line at a position downstream of an after-cooler and intercommunicates the air-supply line and the exhaust manifold; and an EGR line that extracts a part of the exhaust gas from the exhaust manifold to return the part of the exhaust gas to the air-supply line;

wherein the turbocharger comprises a compressor which is connected to the intake manifold, and a turbine which is connected to the exhaust manifold;

wherein the he bypass line communicates with the exhaust manifold at a communicating portion which is provided on one end of the exhaust manifold in a longitudinal direction along an engine-cylinder line;

wherein the EGR line branches from the exhaust manifold at a branch portion which is provided on another end of the exhaust manifold in the longitudinal direction; and wherein the exhaust gas outlet of the exhaust manifold is provided near the communicating portion relative to the branch portion.

8. The supercharged engine with the EGR device according to claim 7, wherein an exhaust gas inlet port to which the exhaust gas from the cylinder flows is provided on the exhaust manifold corresponding to a plurality of the cylinders, and wherein at least one of the exhaust gas inlet ports is located between the communicating portion and the branch portion.

9. The supercharged engine with the EGR device according to claim 7, wherein the exhaust manifold that collects the exhaust gas to the single exhaust gas outlet is provided as a pair of a first manifold and a second manifold.

* * * * *